No. 797,283. PATENTED AUG. 15, 1905.
J. G. HUGHES.
MOTOR CYCLE.
APPLICATION FILED APR. 13, 1905.
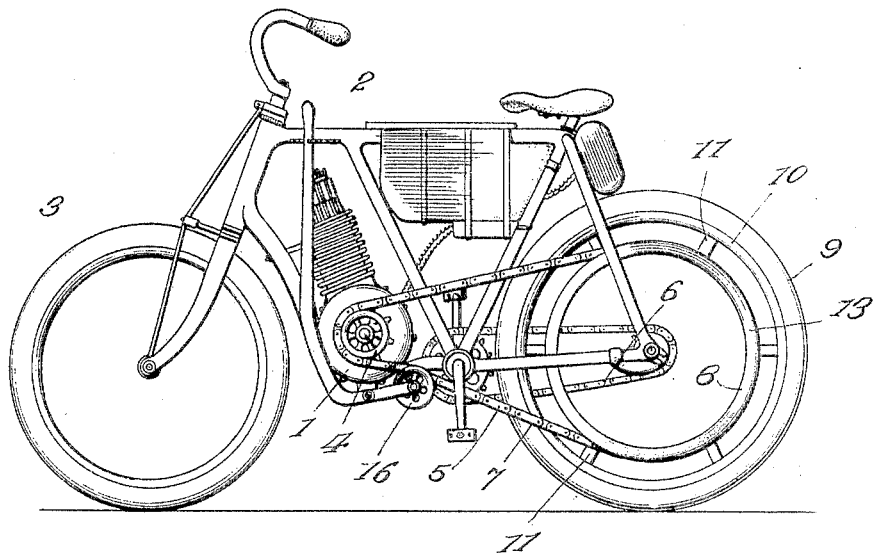
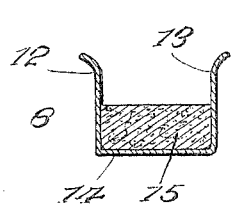
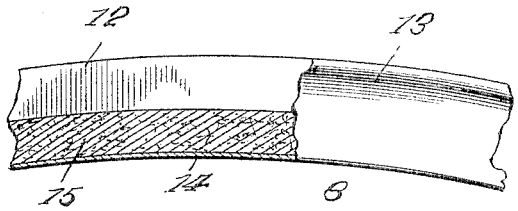
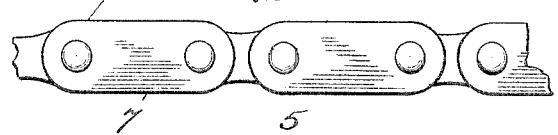

UNITED STATES PATENT OFFICE.

JAMES G. HUGHES, OF OLNEY, ILLINOIS.

MOTOR-CYCLE.

No. 797,283.        Specification of Letters Patent.        Patented Aug. 15, 1905.

Application filed April 13, 1905. Serial No. 255,297.

*To all whom it may concern:*

Be it known that I, JAMES G. HUGHES, a citizen of the United States, residing at Olney, in the county of Richland and State of Illinois, have invented a new and useful Motor-Cycle; and I do hereby declare the following to be a full, clear, and exact description of the invention, such as will enable others skilled in the art to which it appertains to make and use the same.

The invention relates to improvements in motor-cycles, and has for its object to improve the construction of motor-cycles and to provide a simple, inexpensive, and efficient arrangement of parts whereby the rear wheel is effectually prevented from slipping and wearing at each explosion of the motor.

A further object of the invention is to simplify the construction of motor-cycles, lessen their cost of construction, and at the same time increase their durability.

With these and other objects in view the invention consists in the construction and novel arrangement of parts hereinafter described and shown, and particularly pointed out in the appended claims.

In the drawings forming part of this specification, and in which like numerals of reference designate corresponding parts, Figure 1 is a perspective view of a motor-cycle constructed in accordance with this invention. Fig. 2 is a longitudinal sectional view of the gearing. Fig. 3 is a transverse sectional view of the pulley of the rear wheel. Fig. 4 is a section of the drive-chain.

Referring to the drawings, 1 designates a motor of the explosive-engine type, which may be of any desired construction and which is suitably mounted on a bicycle-frame 2 of the ordinary construction. The motor, which is located in rear of the front wheel 3, is provided with a drive-wheel 4 of the sprocket type, which is mounted on one end of the motor-shaft and which receives an endless sprocket-chain 5. The endless sprocket-chain, which is provided with links having straight side edges 6 and 7, is also arranged on a large pulley 8, mounted on the rear wheel 9 of the bicycle and connected with the rim 10 of the rear wheel by short outwardly-extending arms 11.

The pulley 8 consists of a rim approximately U-shaped in cross-section, having substantially parallel inner and outer sides or walls and a connecting transverse portion 14. The transverse portion 14, which connects the inner and outer walls or sides 12 and 13, is straight in cross-section. The rim of the pulley forms a groove to receive the sprocket-chain, and it has an interiorly-arranged band 15, of rawhide or other suitable material, presenting a smooth surface to the chain and adapted to prevent the same from materially slipping during the ordinary operation of the motor-cycle; but the rawhide tread or band is adapted to permit the chain to slip sufficiently at each explosion of the motor to prevent the rear wheel from dragging or slipping on the ground, and thereby becoming worn. By this construction the objectionable wear on the tire of the rear wheel incident to the ordinary motor-cycle is effectually prevented, and by employing a sprocket drive-wheel the slipping of the chain at that point is prevented. In this manner greater power is obtained and the durability of the motor-cycle is greatly increased.

A suitable belt-tightener 16, which may be of any ordinary construction, is arranged to engage the lower stretch of the chain for taking up the slack. By employing the large rear pulley the chain is rendered more flexible and liability to accidents is greatly reduced.

What I claim is—

1. In a motor-cycle, the combination with a motor, a small sprocket-wheel mounted on a motor-shaft, a rear cycle-wheel provided with a large pulley having a smooth rim or periphery, and a sprocket-chain meshing with the sprocket-wheel and arranged on and frictionally engaging the large pulley, substantially as described.

2. In a motor-cycle the combination of a motor, a small sprocket-wheel driven thereby, a rear cycle-wheel, a pulley mounted on the rear cycle-wheel and provided with a groove and having a band of flexible material arranged in the groove and forming a smooth periphery, and a chain meshing with the sprocket-wheel and arranged in the groove of the pulley and frictionally engaging the same, substantially as described.

3. In a motor-vehicle, the combination with a motor, a small sprocket-wheel driven thereby, a rear wheel suitably mounted, a pulley mounted on said wheel and provided with a groove and forming a smooth periphery, and a chain meshing with the sprocket-wheel and arranged in the groove of the pulley and frictionally engaging the same, substantially as described.

In testimony whereof I have hereto affixed my signature in the presence of two witnesses.

JAMES G. HUGHES.

Witnesses:
  HARRY C. HUGHES,
  EDWARD S. HUGHES.